US010188095B2

(12) United States Patent
Blair

(10) Patent No.: US 10,188,095 B2
(45) Date of Patent: Jan. 29, 2019

(54) TREE STAND

(71) Applicant: John Blair, Covington, OH (US)

(72) Inventor: John Blair, Covington, OH (US)

( * ) Notice: Subject to any disclaimer, the term of this patent is extended or adjusted under 35 U.S.C. 154(b) by 0 days.

(21) Appl. No.: 13/668,043

(22) Filed: Nov. 2, 2012

(65) Prior Publication Data

US 2013/0299278 A1  Nov. 14, 2013

Related U.S. Application Data

(60) Provisional application No. 61/554,821, filed on Nov. 2, 2011.

(51) Int. Cl.
*A01M 31/02* (2006.01)

(52) U.S. Cl.
CPC .................................. *A01M 31/02* (2013.01)

(58) Field of Classification Search
CPC .................................................. A01M 31/02
USPC ......................................................... 182/187
See application file for complete search history.

(56) References Cited

U.S. PATENT DOCUMENTS

| 4,337,844 | A | * | 7/1982 | Hice, Sr. ........................ 182/187 |
| 4,726,447 | A | * | 2/1988 | Gibson ................. A01M 31/02 108/152 |
| 4,802,552 | A | * | 2/1989 | Williams .............. A01M 31/02 108/152 |
| 4,834,217 | A | * | 5/1989 | Manes .......................... 182/187 |
| 5,090,506 | A | * | 2/1992 | Womack .............. A01M 31/02 108/152 |
| 5,653,309 | A | * | 8/1997 | Sturm ........................... 182/187 |
| 5,680,910 | A | * | 10/1997 | Sarphie, IV .................. 182/135 |
| 5,954,158 | A | * | 9/1999 | Concepcion .................. 182/187 |
| 5,971,104 | A | * | 10/1999 | Woller ........................ 182/136 |
| 6,081,942 | A | * | 7/2000 | Bellamy ........................... 4/460 |
| 6,308,801 | B1 | * | 10/2001 | Futch .................... A01M 31/02 182/136 |
| 6,481,529 | B1 | * | 11/2002 | Voorhies ......................... 182/20 |
| 6,622,823 | B2 | * | 9/2003 | Engstrom ............. A01M 31/02 182/135 |
| 7,306,074 | B2 | * | 12/2007 | Voorhies ................ A63B 27/02 182/136 |
| 7,849,964 | B2 | * | 12/2010 | Amacker ............ A01M 31/006 182/136 |
| 9,357,762 | B2 | * | 6/2016 | Dorrity ................. A01M 31/02 |
| 9,681,655 | B2 | * | 6/2017 | Lee ....................... A01M 31/02 |
| 2002/0139615 | A1 | * | 10/2002 | Penz et al. ..................... 182/136 |
| 2007/0175702 | A1 | * | 8/2007 | Simone ................ A01M 31/02 182/187 |

* cited by examiner

*Primary Examiner* — Colleen M Chavchavadze
(74) *Attorney, Agent, or Firm* — Patent Service Associates, Inc.; Lyman Smith

(57) ABSTRACT

A tree stand is disclosed having few, if any, moving parts. The one-piece design, according to an exemplary embodiment, may make the tree stand simpler to use with less noise during use. The tree stand may include both a seat member and a standing member. A user may climb a tree by standing on the standing member, raising the seat member, sitting on the seat member, raising the standing member, and repeating this process to climb a tree, pole or the like.

6 Claims, 10 Drawing Sheets

TREE STAND

CROSS-REFERENCE TO RELATED APPLICATIONS

This application claims the benefit of priority of U.S. Provisional patent application No. 61/554,821, filed Nov. 2, 2011, the contents of which are herein incorporated by reference.

BACKGROUND OF THE INVENTION

The present invention relates to hunting equipment and, more particularly, to a platform for climbing trees to give a better vantage point.

Tree stands are often used by hunters to provide an elevated vantage point for hunting. Many conventional tree stands require tree steps or ladders to climb a tree. This requires the hunter to carry additional equipment for climbing the tree.

In addition, many convention tree stands are made from several parts joined together. In these tree stands, if a hunter shifts their weight while sitting in the tree stand, the tree stand may squeak, pop or crack. These sounds could scare away game, especially since, when taking aim at game, the hunter often moves about in the tree stand.

As can be seen, there is a need for a tree stand that has minimal, if any, moving parts, that can also be used to climb a tree.

SUMMARY OF THE INVENTION

In one aspect of the present invention, a tree stand comprising a seating member having first and second side members, the side members extending substantially parallel with each other with a bend in each of the first and second side members; a removable tree attachment member, the removable tree attachment member running substantially orthogonal to the first and second side members, spanning from the first side member to the second side member proximate to a first end of the first and second side members; a fixed tree attachment member, the fixed tree attachment member running substantially orthogonal to the first and second side members, spanning from the first side member to the second side member at a location proximate to the bend in each of the first and second side members; first and second angled tree attachment members, the first and second angled tree attachment members interconnecting the fixed tree attachment member with each of the first and second side members, the first and second angled tree attachment members forming an angle with the fixed tree attachment member from about 30 degrees to about 60 degrees; and a fixed seat defining member, the fixed seat defining member running substantially orthogonal to the first and second side members, spanning from the first side member to the second side member proximate to a second, opposite end of the first and second side members.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, an embodiment of the present invention provides a tree stand having few, if any, moving parts. The one-piece design, according to an exemplary embodiment, may make the tree stand simpler to use with less noise during use. The tree stand may include both a seat member and a standing member. A user may climb a tree by standing on the standing member, raising the seat member, sitting on the seat member, raising the standing member, and repeating this process to climb a tree, pole or the like.

Referring now to the Figures, a tree stand 10 may include a seating member 12 and a standing member 14. The seating member 12 and the standing member 14 may have substantially the same size and may attach to a tree 16 (or pole, or the like) with substantially the same mechanism, as described below.

Figure 9:
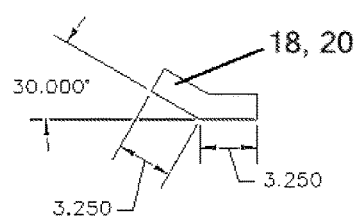
FIG. 9 is a close-up schematic view taken along circle 9 of FIG. 6.
Figure 10:
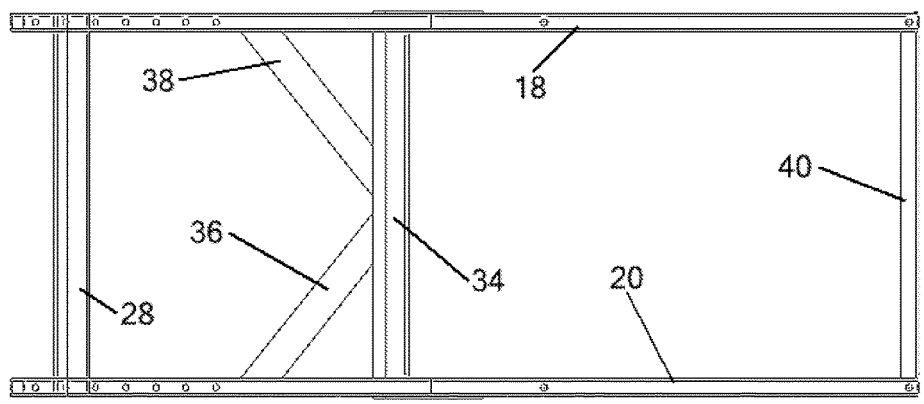
FIG. 10 is a top schematic view of the tree stand of FIG. 5.
Figure 11:
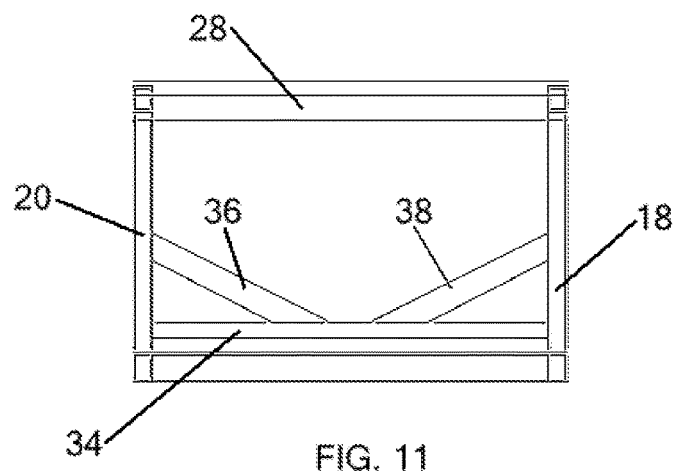
FIG. 11 is a front schematic view of the tree stand of FIG. 5.

The seating member 12 may include a first side member 18 and a second side member 20 running from a first end 22 to a second end 24 of the seating member 12. The side members 18, 20 may be formed from a single piece of material having a bend 26 formed therewithin. The bend 26 may be between about 20 to about 40 degrees, typically about 30 degrees. A reinforcement piece, as shown in FIG. 9, can be disposed about 3 inches into each end of the bend 26. The reinforcement piece can be, for example, formed of ⅝ inch thick steel. The side members 18, 20 may be disposed generally parallel with each other. Holes may be disposed along an upward facing surface of the side members 18, 20. Inserts may fit into these holes to accept various accessories. Typically, from 2 to 11 holes may be disposed along each of the side members 18, 20.

A removable tree attachment member 28 may be removably disposed between the side members 18, 20 at the first end 22 thereof. In some embodiments, the first end 22 of the side members 18, 20 may have a plurality of spaced apart through holes 30 through which a bolt (not shown) may pass to affix the removable tree attachment member 28 to the side members 18, 20. A turning handle 32 may be disposed on one end of the bolt to assist in tightening and loosening the bolt to permit the removable tree attachment member 28 to be removed.

A fixed tree attachment member 34 may be disposed between the side members 18, 20 proximate to the bend 26. The fixed tree attachment member 34 may be disposed generally orthogonally to the side members 18, 20. The fixed tree attachment member 34 may be permanently affixed to the side members 18, 20 by, for example, welding. First and second angled tree attachment members 36, 38 may interconnect the fixed tree attachment member 34 with the side members 18, 20. The first and second angled tree attachment members 36, 38 may form an angle with the fixed tree attachment member 34 between about 30 and about 60 degrees.

A fixed seat defining member 40 may be disposed between the side members 18, 20 at the second end 24 thereof. The fixed seat defining member 40 may be disposed generally orthogonally to the side members 18, 20. The fixed seat defining member 40, the side members 18, 20 and the fixed tree attachment member 34 may form a generally rectangular periphery into which a seat 42 may be disposed. The seat 42 may be, for example, hung by a plurality of seat straps 44 that attach to the side members 18, 20.

Figure 17:
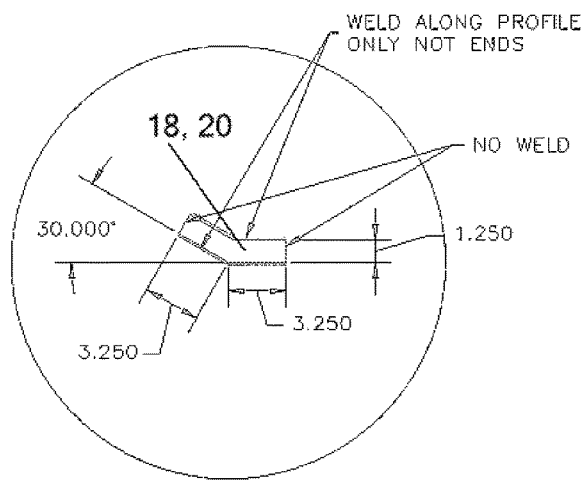
FIG. 17 is a close-up schematic view taken along circle 17 of FIG. 14.
Figure 18:
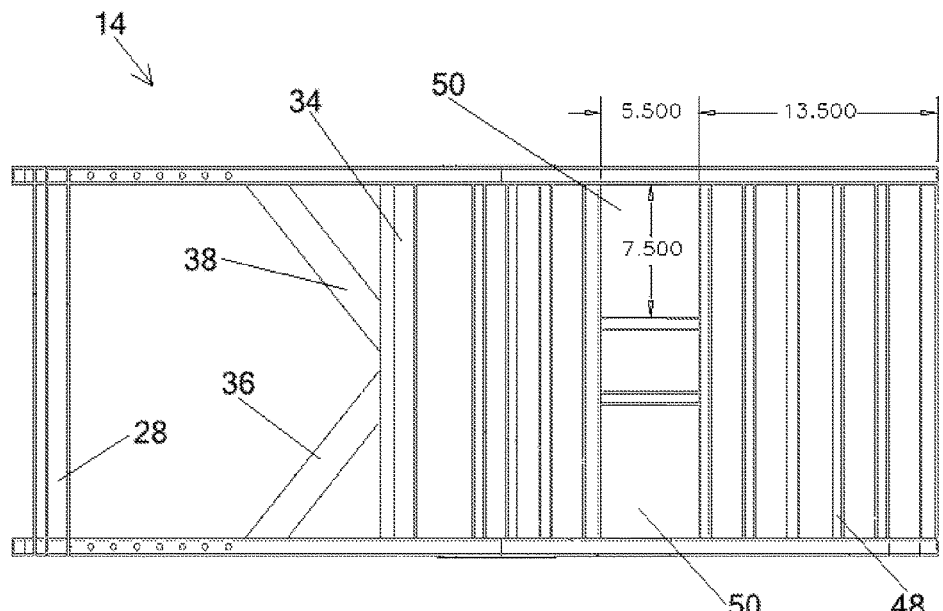
FIG. 18 is a top schematic view of the standing member of FIG. 13.
Figure 19:
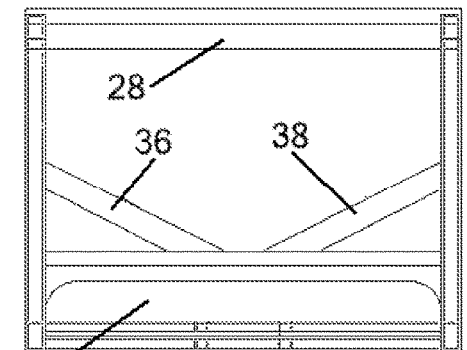
FIG. 19 is a front schematic view of the standing member of FIG. 13.
Figure 20:
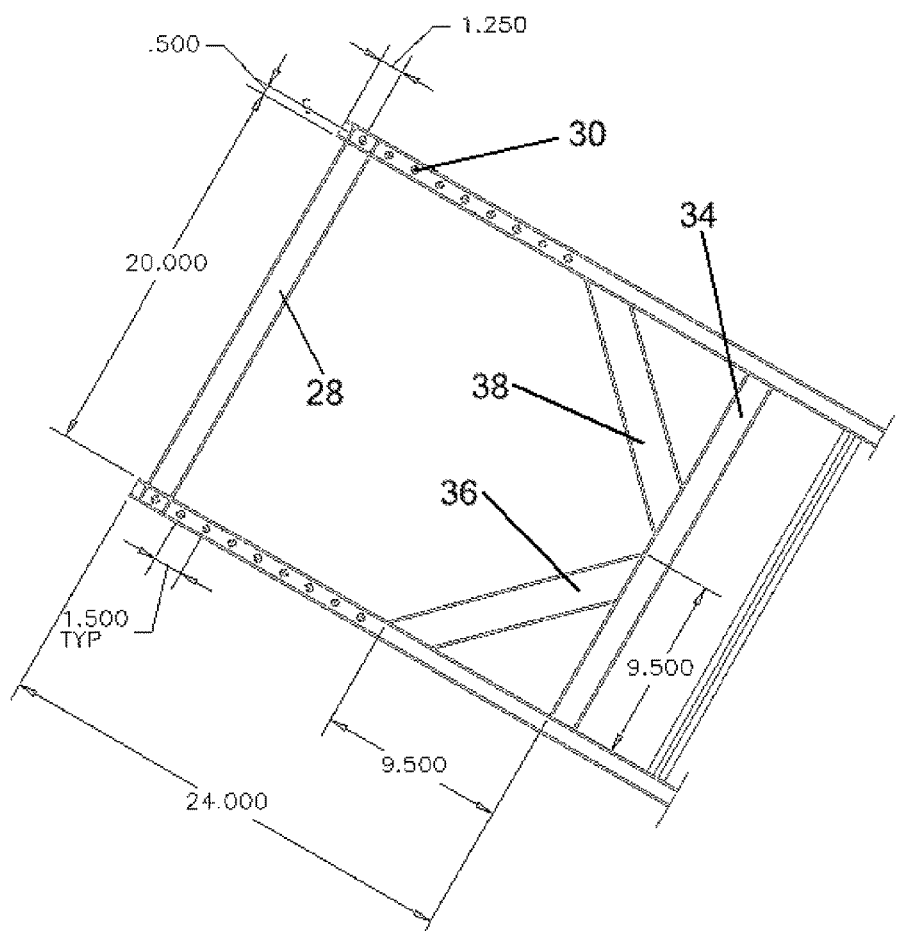
FIG. 20 is a detailed schematic view of a tree attachment section of the standing member of FIG. 13.

The standing member 14 may have a first end 46 that is substantially the same as that of the seating member 12. For example, the standing member 14 may include a removable tree attachment member 28, a fixed tree attachment member 34 and first and second angled tree attachment members 36, 38. A reinforcement piece, as shown in FIG. 17, can be disposed about 3 inches into each end of a bend in the side members 18, 20 of the standing member 14. The reinforcement piece can be, for example, formed of ⅝ inch thick steel. A plurality of standing member cross members 48 may be disposed between the side members 18, 20 of the standing member 14. The standing member cross members 48 may permit a user to stand on top of the cross members 48. In some embodiments, a gap 50 may be left between the side members. The gap 50, for example, may be sized sufficient to permit a hunter to use their foot, placed in the gap 50, to hook onto the standing member 14 and raise the standing member, as described in greater detail below. A lip 52 may be formed at a second end 54 of the standing member 14. The lip 52 may extend above a plane formed by the plurality of cross members 48, providing a safety factor for a user standing on the standing member 14.

The tree stand 10 may be constructed such that there are no moving parts, except for the removable tree attachment member 28. Because all the parts are welded together, the tree stand 10 may not make noise as a hunter shifts positions in the tree stand 10.

Figure 1:
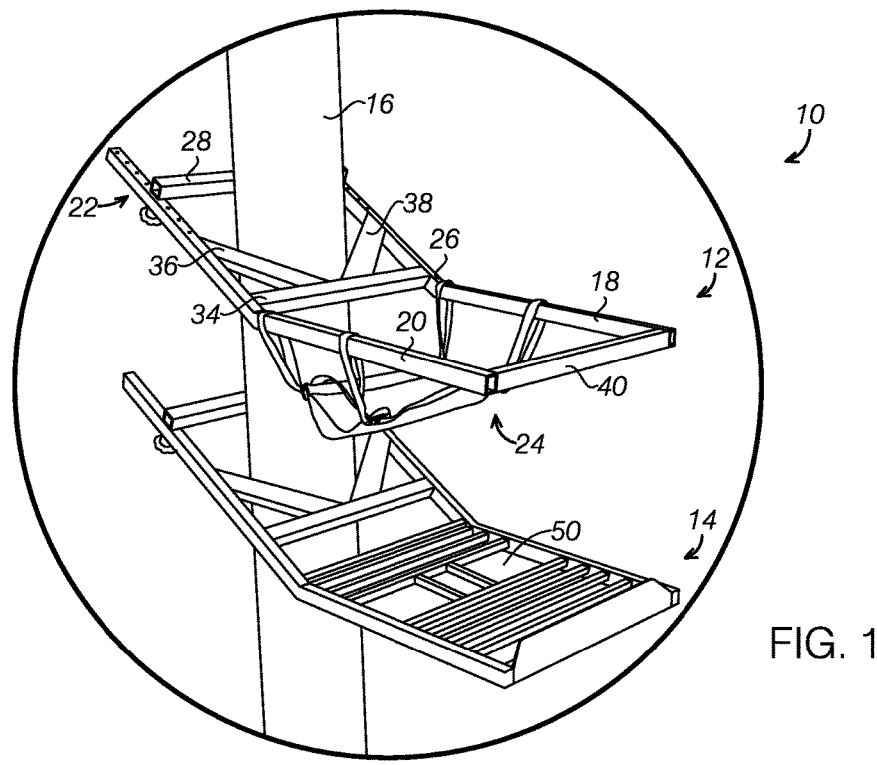
FIG. 1 is a perspective front view of a tree stand according to an exemplary embodiment of the present invention.
Figure 2:
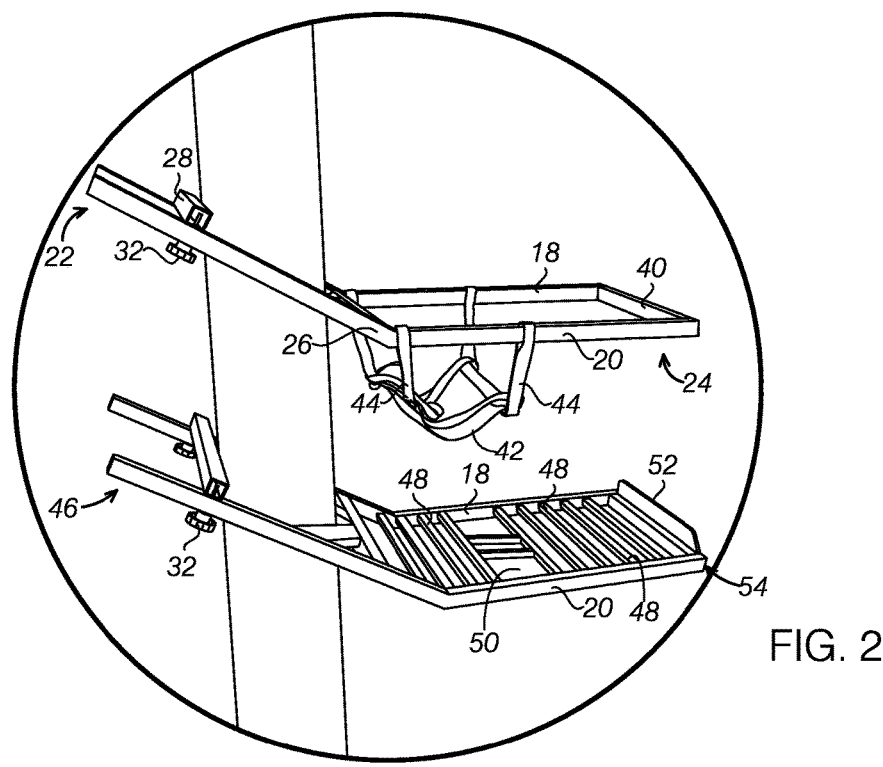
FIG. 2 is a perspective side view of the tree stand of FIG. 1.
Figure 3:
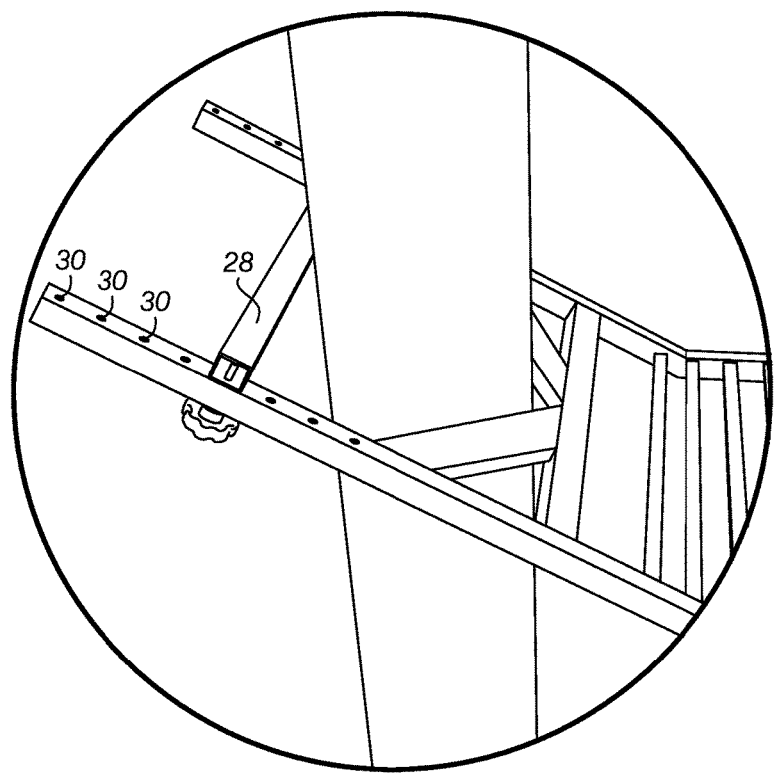
FIG. 3 is a close-up perspective view of a tree attachment mechanism of the tree stand of FIG. 1.
Figure 4:
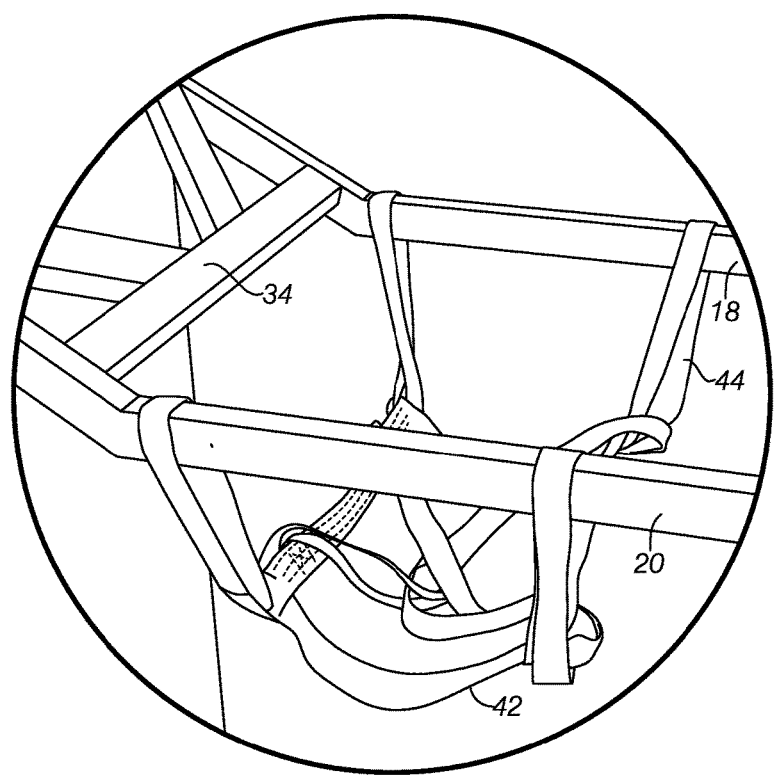
FIG. 4 is a close-up perspective view of a seat defining member of the tree stand of FIG. 1.
Figure 5:
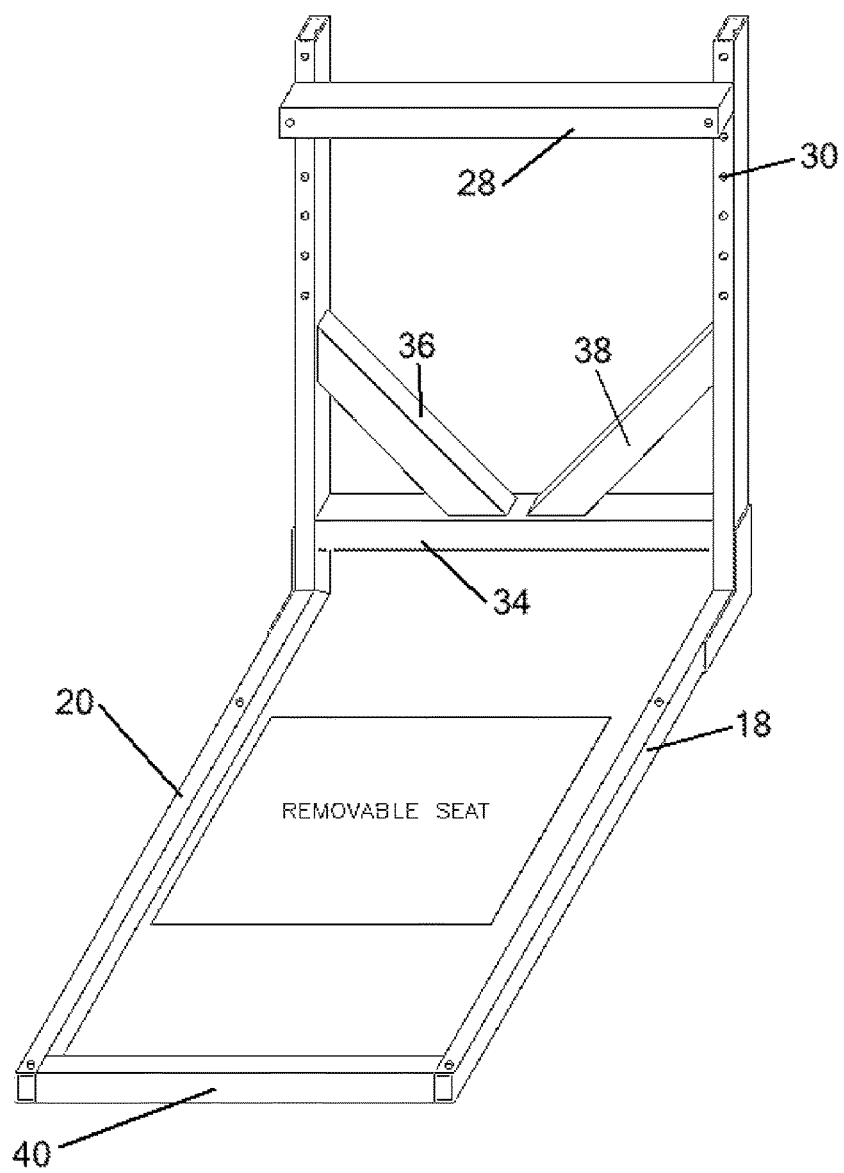
FIG. 5 is a perspective schematic view of the tree stand of FIG. 1.

To use the tree stand, a hunter may first place both the seating member 12 and the standing member 14 on the tree 16, near the ground, as shown in FIG. 1, for example. The removable tree attachment member 28 may be adjustably attached to the side members 18, 20 such that the side members 18, 20 at the second end 24, 54 of the tree stand 10 is roughly horizontal. The user may sit in the seat 42 and lift the standing member 14 toward the seating member 12. The user may then stand on the standing member 14, and push the seating member 12 up the tree. The user then sits back in the seat 42 and, again, raises the standing member 14 toward the seating member 12. This process is repeated until the desired height is obtained. A strap (not shown) may be disposed on the standing member 14 to help lift the standing member 14 up the tree 16.

Safety straps (not shown) may be included with the tree stand 10. For example, a strap may interconnect a component, such as the removable tree attachment members 34, of the standing member 14 and the seating member 12. This may help keep the standing member 14 from separating from the seating member 12 beyond a predetermined distance. A further safety strap, such as a bungee cord, may attach to each of the first ends 22 of the first and second side members 18, 20. This safety strap may elastically extend around the tree 16 when a desired height is achieved. Other straps, as may be known in the art, may be useful with the tree stand of the present invention. One or more of the safety straps may be used as a carrying strap or harness to assist a user in carrying the tree stand into the woods, for example.

As shown in the schematic figures, various components of the tree stand 10 may be made form square tubing, such as 1½ to 2 inch square tubing. The tubing may be made of, for example, aluminum, steel, galvanized steel, plastic, composite, or the like. While the figures show various exemplary sized for the materials, other sized may be used in the tree stand according to a user's preference.

Figure 6:
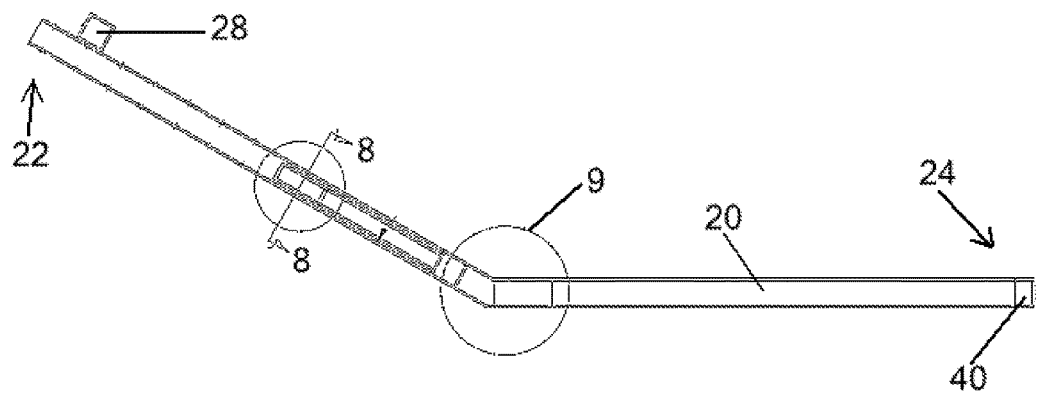
FIG. 6 is a side schematic view of the tree stand of FIG. 5.
Figure 7:
FIG. 7 is a detailed schematic view of a removable tree attachment member of the tree stand of FIG. 6.
Figure 8:
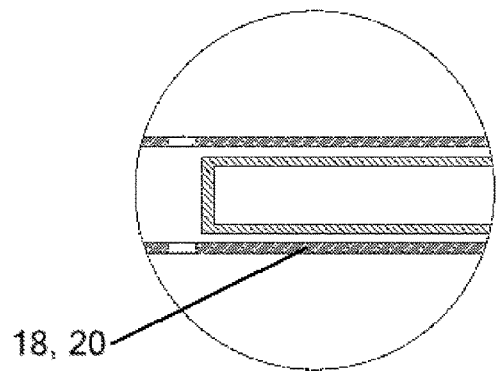
FIG. 8 is a cross-sectional view taken along line 8-8 of FIG. 6.
Figure 12:
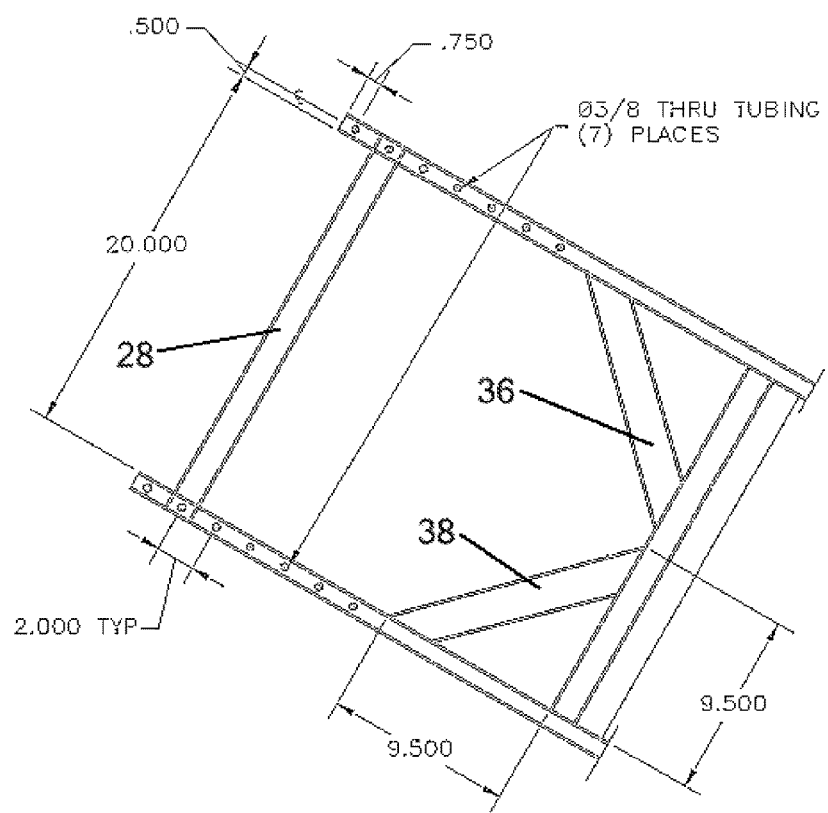
FIG. 12 is a detailed schematic view of a tree attachment section of the tree stand of FIG. 5.
Figure 13:
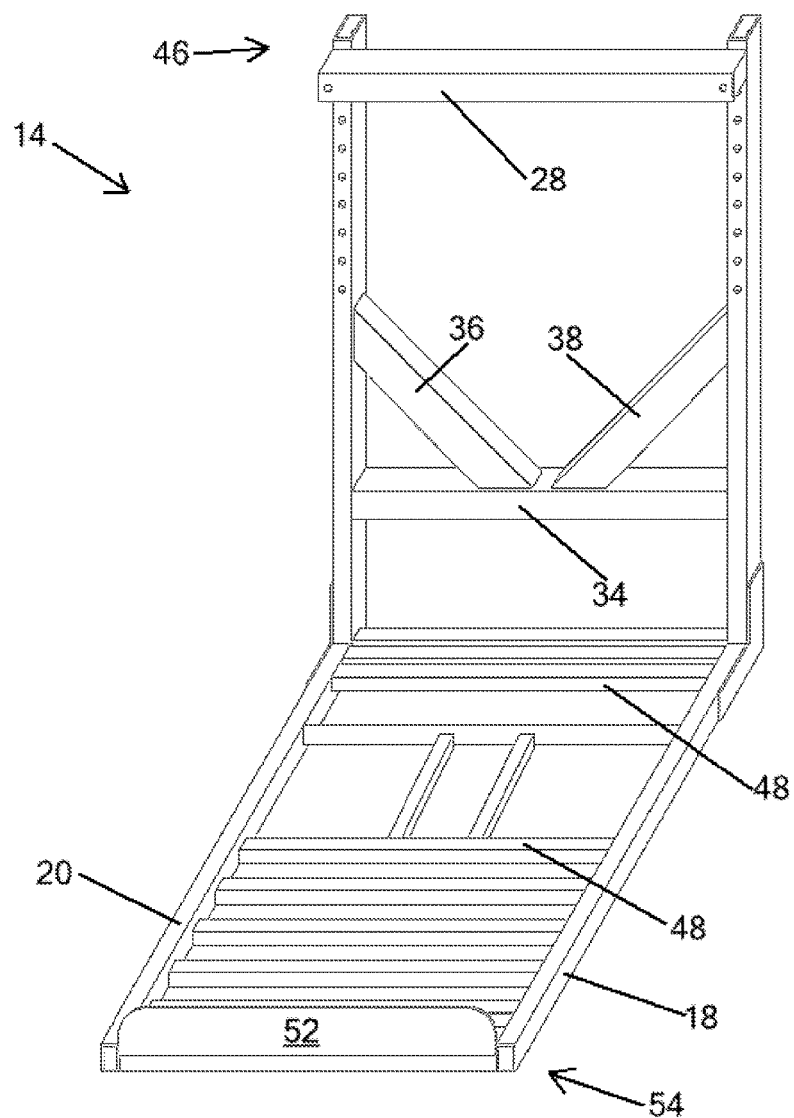
FIG. 13 is a perspective schematic view a standing member of the tree stand of FIG. 1.
Figure 14:
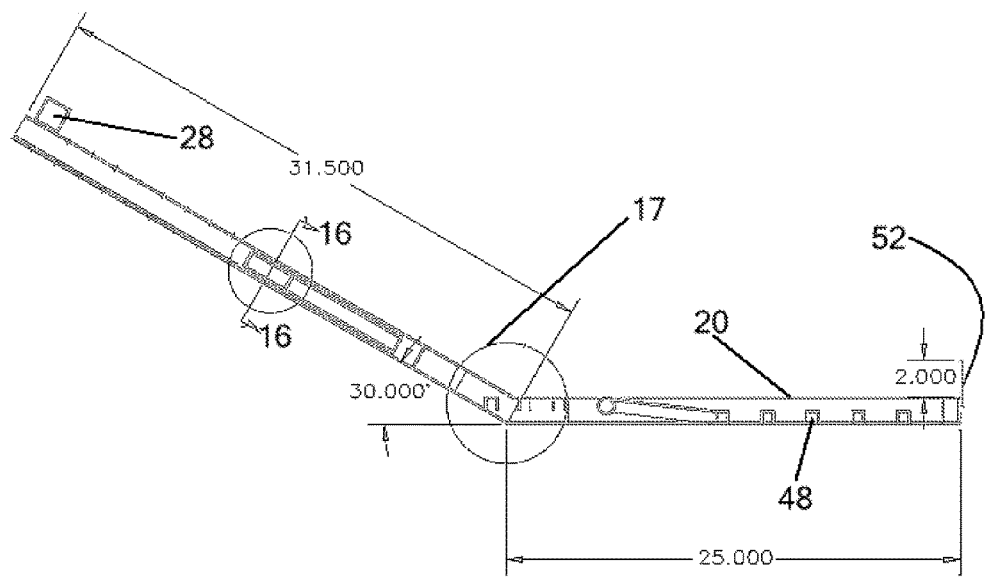
FIG. 14 is a side schematic view of the tree stand of FIG. 13.
Figure 15:
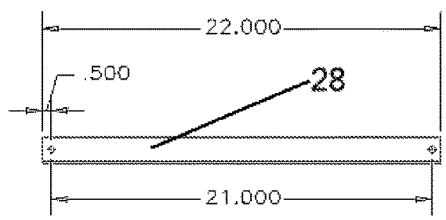
FIG. 15 is a detailed schematic view of a removable tree attachment member of the standing member of FIG. 13.
Figure 16:
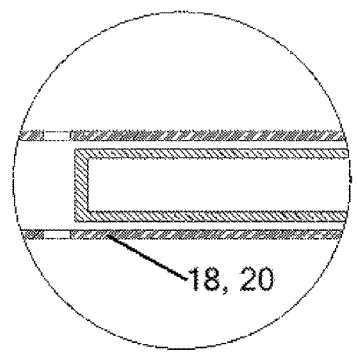
FIG. 16 is a cross-sectional view taken along line 16-16 of FIG. 14.

The dimensions shown in the drawings are only exemplary, and other sizes and configurations may be within the scope of the present invention. For example, in FIG. 6, the lengths of the side members 18, 20 can be, for example 27.5 inches, instead of 27 and 28 inches, respectively. The through hole sizes can vary as well. For example, in FIG. 7, the through holes through the tubing 28 can vary from 0.375 (as shown in FIG. 7) to about 0.313, for example. Brackets can vary as well, such as in FIG. 9, where the lengths could be about 3.0 inches, instead 3.25 inches, as shown. Also, the adjustment holes, such as those shown in FIG. 12, can be spaced closer together, for example, 1.5 inches apart instead of 2 inches apart, as shown, and more holes can be provided, for example 9 holes instead of 7. Other variations are contemplated within the scope of the present invention.

It should be understood, of course, that the foregoing relates to exemplary embodiments of the invention and that modifications may be made without departing from the spirit and scope of the invention as set forth in the following claims.

What is claimed is:
1. A tree stand comprising a seating member having:
first and second side members, the side members extending substantially parallel with each other with a bend in each of the first and second side members, the first and second side members each having a first end and a second end opposite the first end;

a removable tree attachment member, the removable tree attachment member being a linear member running substantially orthogonal to the first and second side members, spanning from the first side member to the second side member proximate to the first end of the first and second side members;

a fixed tree attachment member, the fixed tree attachment member running substantially orthogonal to the first and second side members, spanning from the first side member to the second side member at a location between the bend and the first end of each of the first and second side members;

first and second angled tree attachment members, the first and second angled tree attachment members interconnecting the fixed tree attachment member with each of the first and second side members, the first and second angled tree attachment members forming an angle with the fixed tree attachment member from about 30 degrees to about 60 degrees;

a fixed seat defining member, the fixed seat defining member running substantially orthogonal to the first and second side members, spanning from the first side member to the second side member proximate to the second end of the first and second side members; and a seat attached to the side members via a plurality of seat straps, each of the seat straps disposed as loops about the side members, the loops disposed between the fixed tree attachment member and the fixed seat defining member.

2. The tree stand of claim 1, wherein the bend is from about 20 to about 40 degrees with respect to a horizontal plane extending along and from an underside of a horizontal section of the side members.

3. The tree stand of claim 1, wherein the first and second side members are each formed of a continuous, one-piece structural element.

4. The tree stand of claim 1, further comprising a standing member, the standing member having:

first and second standing member side members, the standing member side members extending substantially parallel with each other with a bend in each of the first and second standing member side members;

a standing member removable tree attachment member, the standing member removable tree attachment member running substantially orthogonal to the first and second standing member side members, spanning from the first standing member side member to the second standing member side member proximate to a first end of the first and second standing member side members;

a standing member fixed tree attachment member, the standing member fixed tree attachment member running substantially orthogonal to the first and second standing member side members, spanning from the first standing member side member to the second standing member side member at a location proximate to the bend in each of the first and second standing member side members;

first and second standing member angled tree attachment members, the first and second standing member angled tree attachment members interconnecting the standing member fixed tree attachment member with each of the first and second standing member side members, the first and second standing member angled tree attachment members forming an angle with the standing member fixed tree attachment member from about 30 degrees to about 60 degrees; and a plurality of standing member cross members disposed generally orthogonally and spanning between the first and second standing member side members, the standing member cross members disposed proximate to a second, opposite end of the first and second standing member side members.

5. A tree stand comprising:

a seating member having:

first and second side members, the first and second side members extending substantially parallel with each other with a bend in each of the first and second side members, the first and second side members are formed of a continuous, one-piece structural element, the first and second side members each having a first end and a second end opposite the first end;

a removable tree attachment member, the removable tree attachment member being a linear member running substantially orthogonal to the first and second side members, spanning from the first side member to the second side member proximate to the first end of the first and second side members;

a fixed tree attachment member, the fixed tree attachment member running substantially orthogonal to the first and second side members, spanning from the first side member to the second side member at a location between the bend and the first end of each of the first and second side members;

first and second angled tree attachment members, the first and second angled tree attachment members interconnecting the fixed tree attachment member with each of the first and second side members, the first and second angled tree attachment members forming an angle with the fixed tree attachment member from about 30 degrees to about 60 degrees;

a fixed seat defining member, the fixed seat defining member running substantially orthogonal to the first and second side members, spanning from the first side member to the second side member proximate to a second, opposite end of the first and second side members; and a seat attached to the side members via a plurality of seat straps, each of the seat straps disposed as loops about the side members, the loops disposed between the fixed tree attachment member and the fixed seat defining member; and a standing member having:

first and second standing member side members, the standing member side members extending substantially parallel with each other with a bend in each of the first and second standing member side members;

a standing member removable tree attachment member, the standing member removable tree attachment member running substantially orthogonal to the first and second standing member side members, spanning from the first standing member side member to the second standing member side member proximate to a first end of the first and second standing member side members;

a standing member fixed tree attachment member, the standing member fixed tree attachment member running substantially orthogonal to the first and second standing member side members, spanning from the first standing member side member to the second standing member side member at a location proximate to the bend in each of the first and second standing member side members;

first and second standing member angled tree attachment members, the first and second standing member angled tree attachment members interconnecting the standing member fixed tree attachment member with each of the first and second standing member side members, the first and second standing member angled tree attachment members forming an angle with the standing member fixed tree attachment member from about 30 degrees to about 60 degrees;

a lip extending between the first and second standing member side members, the lip disposed at a second, opposite end of the first and second standing member side members, the lip extending upward above a plane formed between the first and second standing member side members; and a plurality of standing member cross members disposed generally orthogonally and spanning between the first and second standing member side members, the plurality of standing member cross members include a first plurality spaced apart by a first distance and disposed proximate to the second, opposite end of the first and second standing member side members and a second plurality spaced apart by a second distance disposed proximate to the standing member fixed tree attachment member, with a gap, greater than the first distance and the second distance, disposed between the first plurality and the second plurality.

6. The tree stand of claim 5, wherein the bend is from about 20 to about 40 degrees with respect to a horizontal plane extending along and from an underside of a horizontal section of the side members.

* * * * *